April 14, 1936.　　　　H. FORD　　　　2,037,126
MOTOR VEHICLE
Filed May 2, 1932　　　　4 Sheets-Sheet 1
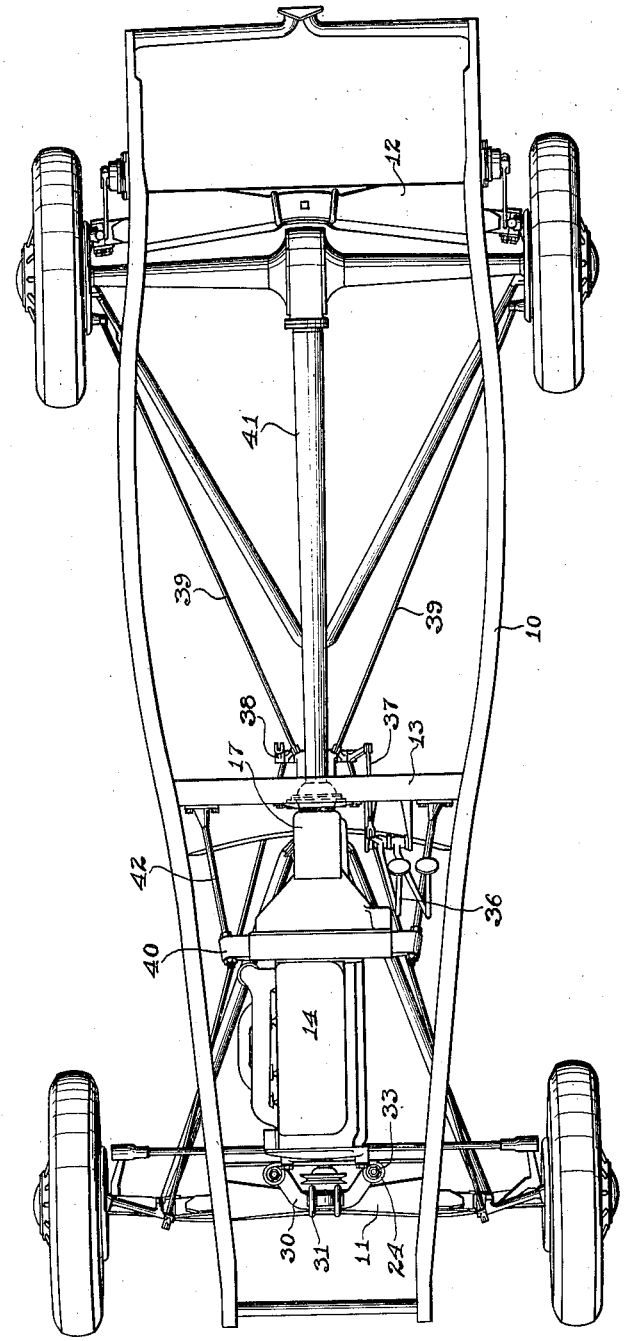
INVENTOR.
Henry Ford.
BY
E. L. Davis
ATTORNEY.

April 14, 1936.   H. FORD   2,037,126
MOTOR VEHICLE
Filed May 2, 1932   4 Sheets-Sheet 2
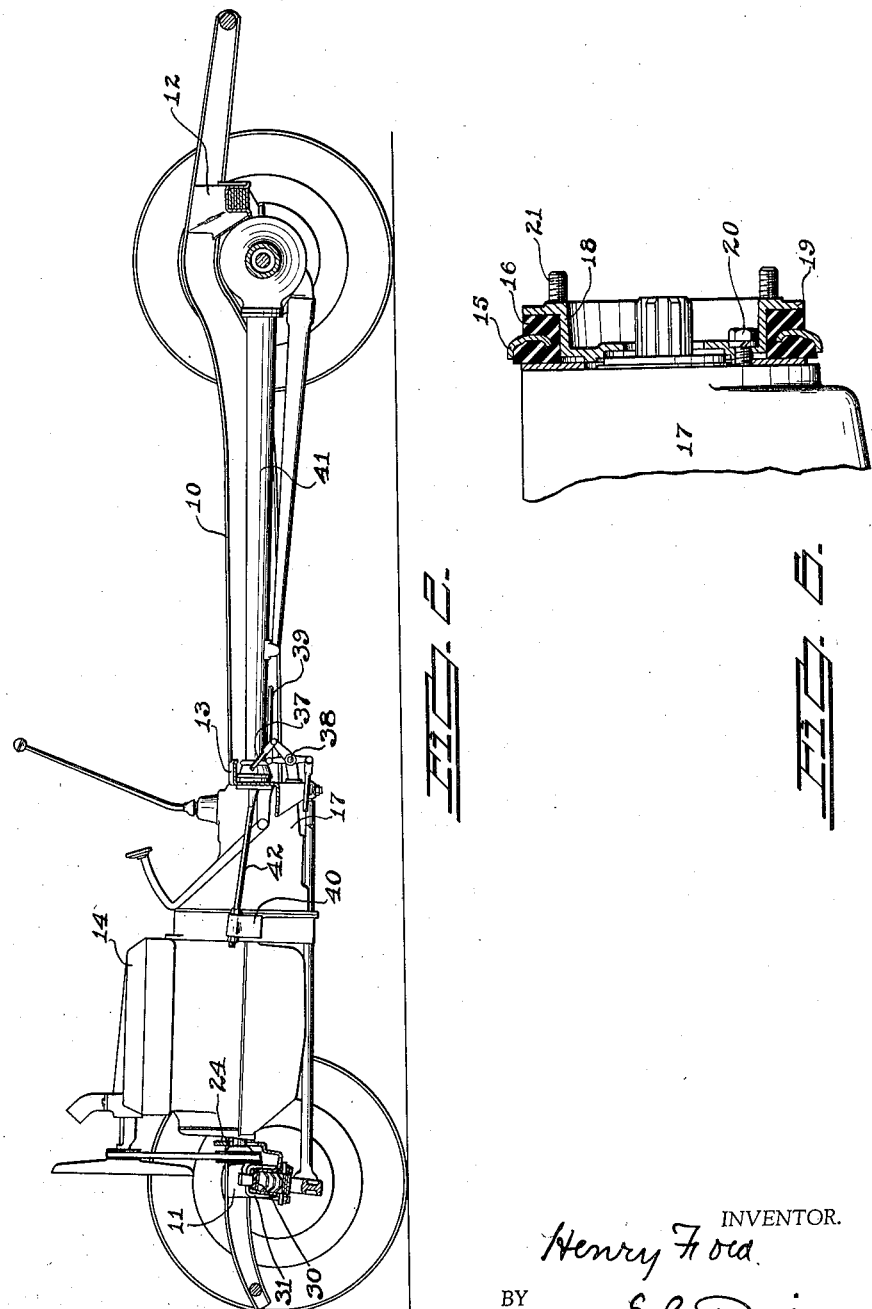
INVENTOR.
Henry Ford
BY
ATTORNEY.

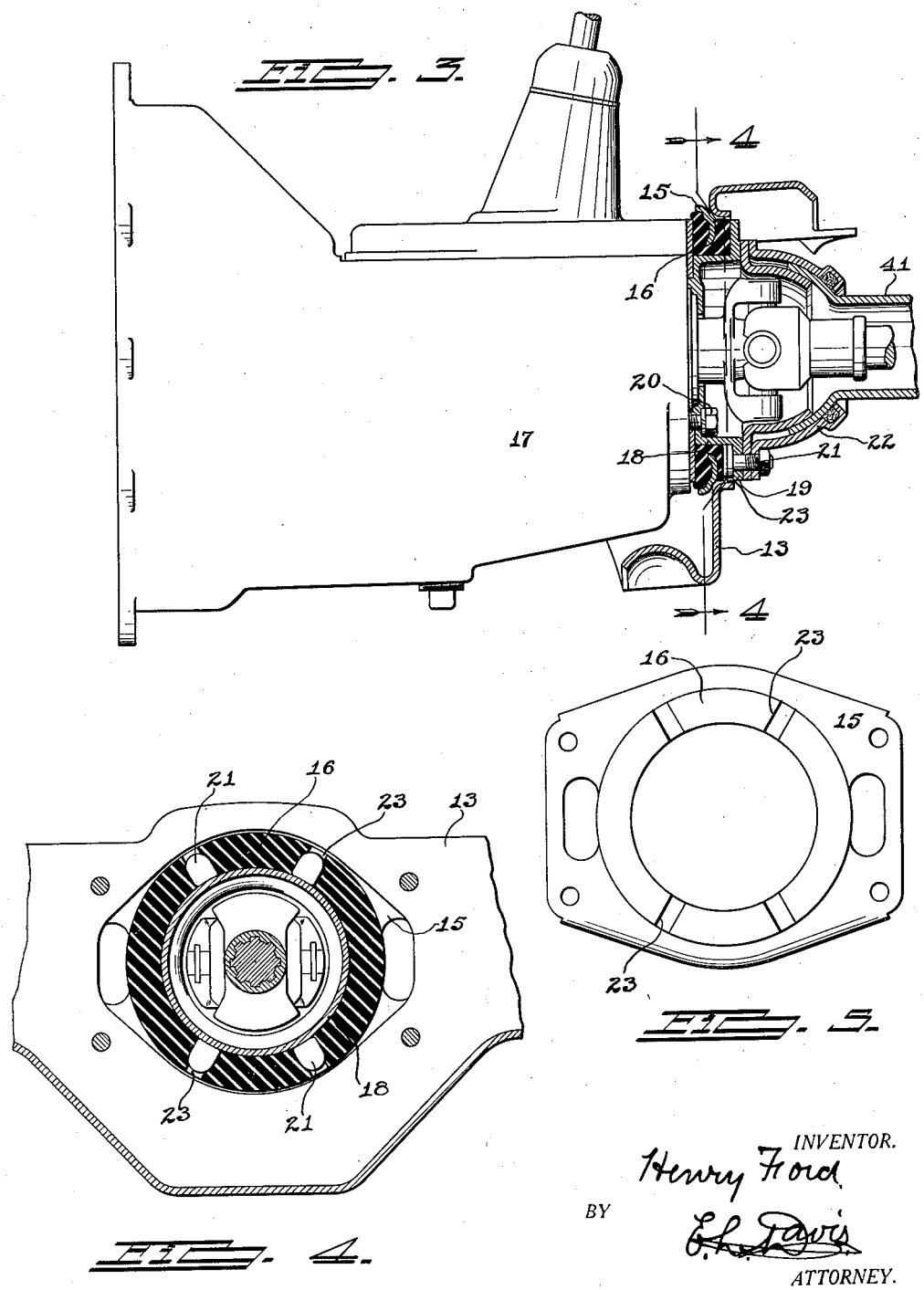

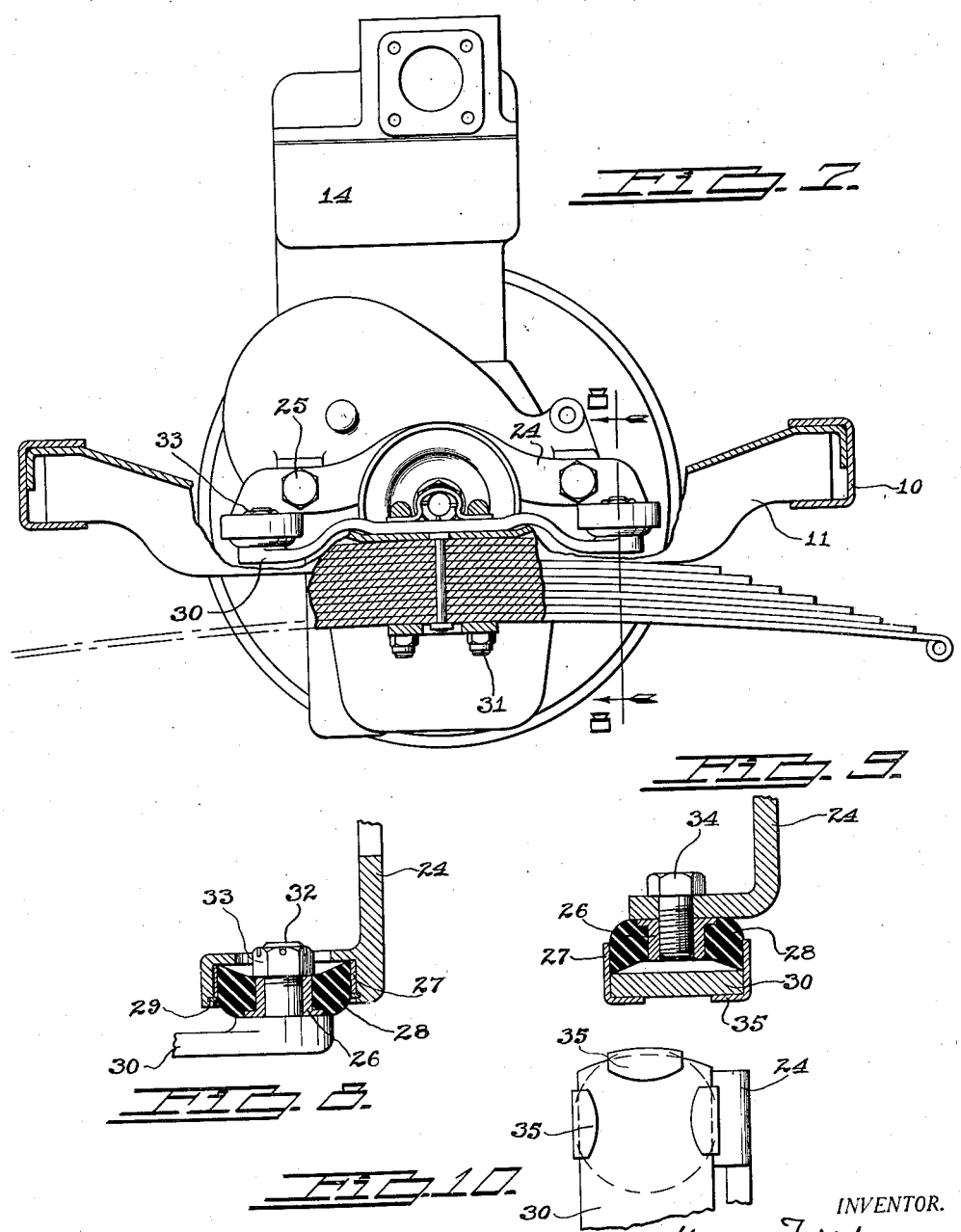

Patented Apr. 14, 1936

2,037,126

UNITED STATES PATENT OFFICE 2,037,126

MOTOR VEHICLE

Henry Ford, Dearborn, Mich., assignor to Ford Motor Company, Dearborn, Mich., a corporation of Delaware Application May 2, 1932, Serial No. 608,786

15 Claims. (Cl. 248—7)

The object of my invention is to provide an automobile of novel construction wherein the motor is resiliently mounted in the vehicle frame so that transfer of motor vibration to the frame will be eliminated. It is well known that all piston-type internal combustion engines produce certain vibration, caused either by unbalanced conditions in the engine, such as the secondary unbalanced inertial forces of the four-cylinder type engine, or resulting from torsional reaction, or from the natural frequency of certain parts of the frame coinciding with the vibrating frequency of the motor. In this construction the motor is mounted in the frame by supporting both of its ends on rubber cushions so that the engine is permitted a sufficient movement in the frame to damp out its vibrations by its own mass.

My improved mounting differs from all other resilient mountings of this class with which I am familiar, in that the motor, while being permitted absolute freedom of movement in the vertical, lateral and torsional directions, is positively restricted from movement longitudinally in the frame, the means for restricting this movement being unique in that it does not affect in any way the movements of the motor in the other directions. The purpose of the above mentioned restricting device is to correct certain inherent defects resulting in all resilient type mountings, particularly in so far as the vehicle brakes are affected by such mountings, as will be more fully described later in the specification.

Still, a further object of my invention is to provide means for supporting the front end of the motor whereby the torque reaction is resisted through a pair of rubber cushions. These cushions are distinguished from the ordinary mounting of this type in that they are not directly supported upon the vehicle frame, but rather are supported upon a resilient auxiliary bracket which is secured to the center portion of the front vehicle spring, thereby transmitting the torque reaction directly through this bracket to the vehicle spring. Although the front frame cross member is also secured to this center portion of the spring, nevertheless, due to the resiliency of this bracket, the vibration transmitted to the frame at this point is materially less than that otherwise transmitted if the rubber cushions were to be mounted directly upon the frame cross member.

Still, a further novel feature of this device is the means for resiliently supporting the rear portion of the engine, this means comprising an annular resilient rubber ring which fits around a cylindrical bracket secured to the rear end of the engine unit. This ring is provided with a central plate vulcanized therein, which plate is bolted to the central frame cross member, the cylindrical portion of the bracket being of a length less than the thickness of the rubber ring, so that when the bracket is drawn down in place, the rubber ring will be compressed. The applicant has found that a rubber support, initially placed under compression offers advantages over a free rubber mounting, as heretofore provided.

With these and other objects in view, my invention consists in the arrangement, construction and combination of the various parts of my improved device as described in the specification, claimed in my claims and illustrated in the accompanying drawings, in which:

Figure 1 shows a plan view of an automobile chassis having its motor mounted therein according to this invention.

Figure 2 shows a vertical longitudinal sectional view through the chassis, shown in Figure 1, the view being taken just inside of the left hand frame side member to better illustrate the mounting.

Figure 3 shows a central vertical longitudinal sectional view, taken through the universal joint housing and the rear motor support.

Figure 4 shows a sectional view, taken on the line 4—4 of Figure 3.

Figure 5 shows a plan view of the rear motor support, showing the flange whereby it is secured to the center cross member of the frame.

Figure 6 shows the free position of the rear motor support, prior to being placed under compression by its retaining bracket.

Figure 7 shows a front elevation of the front motor mounting, parts being broken away to illustrate the construction.

Figure 8 shows a sectional view, taken on the line 8—8 of Figure 7.

Figure 9 shows an optical arrangement whereby the resilient cushions at the front of the motor may, if desired, be secured in place, and Figure 10 shows a bottom view of the construction, shown in Figure 9, illustrating the clips whereby the cushion is detachably secured to its bracket.

Referring to the accompanying drawings, I have used the reference numeral 10 to indicate a conventional vehicle frame which is composed of front and rear cross members 11 and 12, respectively, and which frame is provided with a central cross member 13. Conventional front and rear axles are also provided, the front and rear cross members being supported on their respective axles by means of front and rear transverse springs.

I have provided a motor 14 disposed between the cross members 11 and 13, the motor illustrated being of the four cylinder type, but it will be apparent that any other motor may be equally as well used and that this illustration shows just one of the ordinary types of vehicle motors adapted for use herein.

Referring to Figures 3 through 6, my rear motor support is shown. This support is built around a rectangular-shaped metal plate 15, having a relatively large annular opening in the center thereof and having a small bolt-receiving opening in each corner thereof. A ring 16 of resilient rubber is vulcanized around the edges of said annular opening in the plate 15, this rubber ring projecting from each side of the plate and projecting inwardly from the edge of the opening. The plate 15 is adapted to be secured to the center portion of the cross member 13, there being an annular opening therein through which the rubber ring 16 projects. The plate 15 and ring 16 is therefore an integral unit which may be readily fastened in place by bolting or riveting the corners thereof to the cross member.

In order to fasten the motor to the ring 16, a cylindrical bracket 18 is provided, this bracket being adapted to be fastened by screws 20 to the rear of the transmission 17, this transmission being designed as a unit with the motor 14. This cylindrical bracket has a radial flange 19 extending from its rearmost end, the length of the cylindrical portion being about ⅛ of an inch less than the thickness of the rubber ring 16, so that when the bracket is drawn down by means of the screws 20, the rubber ring 16 will be placed under compression between the flange 19 and the rear end of the transmission 17. The rubber will thereby tightly grip the cylindrical portion of the bracket 18 so that the rear end of the motor will be restricted to a small vertical, lateral, longitudinal and torsional movement. Figure 6 illustrates the free position of the parts while Figure 3 shows the ring under compression.

It will be noted from Figure 3 that a plurality of bolts 21 extend rearwardly through the flange 19 so as to secure universal joint housing 22 to the flange. The heads of these bolts 21 project inwardly from the flange 19 and I have thus provided a plurality of slots 23 in the rubber ring 16, the width of said slots being slightly less than the width of the heads of the bolts 21, so that when the bracket 18 is secured in position the rubber of the ring will intimately fit around the heads of these bolts. Thus, torsional movement of the ring relative to the flange 19 and the motor is further prevented by the keying action of these bolt heads in the slots 23.

Referring now to Figure 7, the front motor support is shown which consists of a bracket 24, bolted by cap screws 25 to the front end of the engine just above the crankshaft, this bracket extending about 6 inches on each side of the center. The ends of this bracket are apertured to receive rubber cushions, these cushions being formed as a pair of concentric metal sleeves 26 and 27, between which is vulcanized a soft ring of rubber 28. There are, of course, two of these cushions, one for each end of the bracket 24, and each of which is held in its apertured end of the bracket by means of a snap ring 29.

Heretofore when such cushions have been used, it has been customary to anchor them directly upon the vehicle frame; however, I have departed somewhat from this well-known construction in that I form an independent resilient support for these cushions which is secured only to the center portion of the front spring so that slight vibration which may be transmitted through these cushions will be absorbed by the resilient support independently of the vehicle frame. This resilient bracket consists of a U shaped member 30, the intermediate portion of which is directly bolted to the intermediate portion of the front vehicle spring by means of the pair of spring retaining U-bolts 31. This member 30 is formed from flat spring steel and extends rearwardly and radially from the center of the spring to position just beneath the sleeves 26. The outer ends of the member 30 are formed integrally with studs 32 which extend up through each sleeve 26 and a nut 33 is screwed down on this part to fixedly secure the sleeve 26 in position.

From the foregoing, it will be seen that these cushions permit a limited movement of the front portion of the engine in all directions and that they cooperate with the rear engine mounting in restricting the torsional movement of the engine.

Referring to Figures 9 and 10, an optional front supporting construction is shown. In this construction the rubber mountings are inverted, the center sleeve being bolted directly to the ends of the bracket 24 by means of cap screws 34 while the outer sleeves 27 are provided with ears 35 whereby the cushion may be slipped over the ends of the member 30.

From the foregoing it will be seen that with either construction shown the engine is permitted a limited movement in all directions relative to the frame; however, it will be understood that the engine and rear axle are connected rigidly together by means of the vehicle torque tube 41, so that longitudinal movement of either in the frame will cause similar movement of the other.

Referring now to the vehicle controls, it is well known that in vehicles wherein the engine is resiliently mounted in the frame, the control pedals therefor are desirably supported directly upon the vehicle frame so that oscillation or vibration of the engine will not be transmitted to these pedals. Consequently, I have pivoted my brake pedal 36 on the forward face of the cross member 13, which pedal is connected through a link 37 with a brake cross shaft 38, this latter shaft being pivotally mounted on the rear face of the cross member 13. Brake operating rods 39 extend from cross shaft 38, both forwardly and rearwardly to the brakes associated with each of the vehicle wheels, whereby actuation of the pedal 36 will draw each of these four brake rods 39 inwardly to thereby simultaneously apply the brakes on each of the four wheels.

With the resilient motor mounting and brake hookup just described, a grave inherent defect results in that when the brakes are applied a drag is of course produced on the rear wheels which tends to pull the rear axle, torque tube and motor rearwardly in the frame. This may be stated by considering the inertia of the body and frame tending to advance over the braking mechanism when deceleration is produced. When such occurs the rear pair of brake rods 39 are placed under a higher tension than that caused by the operation of the pedal 36 so that the rear wheel brakes tend to lock as soon as the brakes are applied, the drag of the brakes causing their further application. This defect is believed to be remedied only by preventing longitudinal movement of the motor relative to the frame.

Now, in order to prevent longitudinal movement of the motor relative to the frame and still not restrict the movement of the motor in any other direction, I have provided brackets 40 secured to each side of the engine flywheel housing, each of these brackets having a rod 42 fastened therein, and each of which rods extends rearwardly to the cross member 13. The rods 40 extend substantially parallel to the engine crankshaft so that when the brakes are applied these rods are placed under compression and prevent the longitudinal movement of the engine. These rods 40 are sufficiently small in diameter and of great enough length that the torsional vibration of the engine is not restricted thereby, and in fact movement of the engine in all directions other than longitudinal, is permitted with little or no restriction by these rods 40.

Among the many advantages arising from the use of my improved device it may be well to mention that I have provided a vehicle wherein the motor is resiliently mounted for movement in all directions except the horizontal so that a torque tube drive and mechanically operated brakes may be incorporated therein without being affected by the resilient mounting.

Further, my front engine mounting is so constructed that torsional vibration is absorbed by the vehicle spring rather than by the vehicle frame to thereby prevent engine vibration from entering the frame.

Still further, I have provided a rear engine mounting in which the rubber is placed under compression in a direction transverse to the direction in which all loads including lateral and torsional are applied, so that while the total movement of the mounting is restricted, its resiliency is not impaired.

Still further, the novel means of slotting this mounting to produce a torsional drive by means of the heads of the universal joint retaining bolts is believed to comprise a unique solution for securing a bond with the detachable resilient ring whereby torsional movement of the engine is controlled.

Some changes may be made in the arrangement, construction and combination of the various parts of my improved device without departing from the spirit of my invention and it is my intention to cover by my claims such changes as may reasonably be included within the scope thereof.

I claim as my invention:

1. A mounting adapted to support a motor in a vehicle frame comprising, a resilient member disposed between said motor and frame permitting relative universal movement therebetween, and rigid members disposed between said motor and frame extending substantially parallel to the motor crankshaft, which prevent longitudinal movement of the motor in the frame without resisting other movements of said motor in other directions.

2. A mounting adapted to support a motor in a vehicle frame comprising, a resilient member disposed between said motor and frame permitting relative universal movement therebetween, and compression members disposed between said motor and frame extending substantially parallel to the motor crankshaft, which prevent longitudinal movement of the motor in the frame without resisting other movements of said motor in other directions.

3. A mounting adapted to support a motor in a vehicle frame comprising, a resilient member disposed between said motor and frame permitting relative universal movement therebetween and compression rods extending from each side of the flywheel housing rearwardly to the center frame cross member substantially parallel to the motor crankshaft, which prevent longitudinal movement of the motor in the frame without resisting other movements of said motor in other directions.

4. A motor mounting adapted to resiliently support a motor in a vehicle frame comprising, a resilient ring of rubber disposed between the rear end of the motor and the vehicle frame, said ring permitting torsional and lateral and vertical and longitudinal movements of the motor in said frame, and rigid members extending between said motor and frame substantially parallel to the motor crankshaft, said members resisting longitudinal relative movement of said motor.

5. A motor mounting adapted to resiliently support a motor in a vehicle frame comprising, a resilient ring of rubber disposed between the rear end of the motor and the vehicle frame, said ring permitting torsional and lateral and vertical and longitudinal movements of the motor in said frame, and a pair of rods extending from each side of said motor horizontally to the frame member, said rods resisting longitudinal movement of said motor in the frame for the purpose described.

6. A motor mounting adapted to resiliently support a motor in a vehicle frame comprising, a ring of resilient rubber disposed between the rear end of the motor and the central cross member of said frame, whereby torsional and lateral and vertical and longitudinal movement of said motor in the frame is permitted, and a pair of compression rods extending from each side of said motor flywheel housing rearwardly to said cross member, whereby longitudinal movement of said engine is resisted for the purpose described.

7. A motor mounting adapted to resiliently support one end of a motor in a vehicle frame comprising, a ring of resilient rubber, a cylindrical bracket securing said ring to the rear end of the motor, said bracket having a plurality of projections extending into suitable recesses formed in said rubber ring, whereby relative torsional movement between said ring and motor is resisted, and a plate embedded into said ring adapted to be rigidly secured to said frame to thus support said ring.

8. A motor mounting adapted to resiliently support one end of a motor in a vehicle frame comprising, a ring of resilient rubber, a cylindrical bracket adapted to clamp said ring to the rear end of the motor, said clamping member having a plurality of projections extending into suitable recesses formed in said ring, whereby torsional movement between said ring and motor is resisted, and a plate vulcanized into said ring adapted to be rigidly secured to said frame.

9. A motor mounting adapted to resiliently support one end of a motor in a vehicle frame comprising, a ring of resilient rubber, a cylindrical bracket having a radial flange extending therefrom, means for fastening said bracket to said motor in position whereby said ring is clamped between said flange and the rear end of the engine, a plurality of projections formed on said flange extending into suitable recesses in said rubber ring, whereby relative torsional movement between said ring and motor is resisted, and a plate vulcanized into said ring adapted to be rigidly secured to said frame.

10. A motor mounting adapted to resiliently support the rear end of a motor in a vehicle frame comprising, a ring of resilient rubber, a cylindrical bracket having a radial flange extending therefrom, said flange being adapted to clamp said ring to the rear end of the vehicle motor, a plurality of bolts extending through said flange whereby a universal joint housing is secured into the motor, said bolts having heads thereon extending into suitable slots formed in said ring, whereby relative torsional movement between said ring and motor is resisted, and a plate vulcanized into said ring adapted to be rigidly secured to said frame.

11. A motor mounting adapted to resiliently support the rear end of a motor in a vehicle frame comprising, a ring of resilient rubber, a cylindrical bracket adapted to enter the bore in said ring, said bracket having a radial flange extending therefrom, means for drawing said bracket down against the rear end of the motor whereby said resilient ring is placed under compression, a plurality of bolts extending through said bracket adapted to secure a universal joint housing to the engine, said bolts having their heads projecting into suitable slots formed in said rubber ring whereby relative torsional movement between said ring and engine is resisted, and a plate vulcanized into said ring adapted to be rigidly secured to said frame.

12. A motor mounting adapted to resiliently support the rear end of a motor in a vehicle frame comprising, a ring of resilient rubber, a cylindrical bracket adapted to clamp said ring to the rear end of the motor, whereby torsional movement between said ring and motor is restricted, auxiliary means disposed between said bracket and ring still further resisting said torsional movement, and a plate vulcanized into said ring adapted to be rigidly secured to said frame.

13. A motor mounting adapted to resiliently support the rear end of a motor in a vehicle frame comprising, a ring of resilient rubber, a cylindrical bracket adapted to clamp said ring to the rear end of said motor, said bracket placing the rubber of said ring under compression, a plurality of bolts extending through said bracket adapted to clamp a universal joint housing to the rear of the motor, said bolts having their heads projecting inwardly into said rubber ring, said ring having a corresponding number of radial slots extending therethrough adapted to expand to receive said bolt heads, and a plate vulcanized into said ring adapted to be rigidly secured to said frame.

14. A motor mounting adapted to resiliently support one end of a motor in a vehicle frame comprising, a resilient rubber member, a bracket adapted to detachably secure said member to the end of said motor, said bracket being readily detached from said rubber member and having a plurality of projections extending into suitable recesses formed in said rubber member whereby relative torsional movement between said member and motor is resisted, and a plate imbedded in said rubber member adapted to be rigidly secured to the vehicle frame so as to support said member and the rear end of said motor.

15. A motor mounting adapted to resiliently support one end of a motor in a vehicle frame comprising, a resilient rubber member, a bracket adapted to detachably secure said rubber member to the rear end of said motor, said bracket being readily detached from said rubber member and having a plurality of projections extending into suitable recesses formed in said rubber member whereby movement between said rubber member and motor is resisted, and means adapted to coact with said rubber member independently of said bracket to thereby resiliently support said motor in said frame.

HENRY FORD.